United States Patent [19]

Rembold et al.

[11] Patent Number: 5,343,834
[45] Date of Patent: Sep. 6, 1994

[54] DEVICE FOR ADJUSTING THE ROTATIONAL ANGLE RELATIONSHIP BETWEEN A CAMSHAFT AND ITS DRIVE ELEMENT

[75] Inventors: Helmut Rembold, Stuttgart; Ernst Linder, Mühlacker, both of Fed. Rep. of Germany

[73] Assignee: Robert Bosch GmbH, Stuttgart, Fed. Rep. of Germany

[21] Appl. No.: 962,213

[22] PCT Filed: Apr. 25, 1992

[86] PCT No.: PCT/DE92/00337
§ 371 Date: Jan. 5, 1993
§ 102(e) Date: Jan. 5, 1993

[87] PCT Pub. No.: WO92/20907
PCT Pub. Date: Nov. 26, 1992

[30] Foreign Application Priority Data

May 17, 1991 [DE] Fed. Rep. of Germany ....... 4116152

[51] Int. Cl.$^5$ .................................................. F01L 1/34
[52] U.S. Cl. ............................. 123/90.17; 123/90.31; 462/2; 74/568 R
[58] Field of Search .............. 123/90.15, 90.17, 90.31; 462/1, 2, 160; 74/568 R, 567

[56] References Cited

U.S. PATENT DOCUMENTS

| | | | |
|---|---|---|---|
| 4,858,572 | 8/1989 | Shirai et al. | 123/90.15 |
| 5,056,478 | 10/1991 | Ma | 123/90.17 |
| 5,107,804 | 4/1992 | Becker et al. | 123/90.17 |
| 5,129,370 | 7/1992 | Suga et al. | 123/90.17 |
| 5,179,918 | 1/1993 | Gyurovits | 123/90.31 |

FOREIGN PATENT DOCUMENTS

| | | |
|---|---|---|
| 0163046 | 12/1985 | European Pat. Off. |
| 0388244 | 9/1990 | European Pat. Off. |
| 0424103 | 4/1991 | European Pat. Off. |
| 3930157 | 3/1991 | Fed. Rep. of Germany |

OTHER PUBLICATIONS

Patent Abstracts of Japan, vol. 8, No. 158 (M-311) (1595) Mar. 1984 and JP, A, 59 054 713.

*Primary Examiner*—E. Rollins Cross
*Assistant Examiner*—Weilun Lo
*Attorney, Agent, or Firm*—Michael J. Striker

[57] ABSTRACT

A device for adjusting a rotational angle relationship between a camshaft and its drive element, comprising two circular segment shells provided on the drive element together with an interposed part forming two working spaces therebetween. The both shells are connected to one of the camshaft and the drive element, and the interposed part being connected to the other of the cam shaft and the drive element while the circular segment shells being movable relative to the interposed part in a setting action such that during adjustment in the setting direction the circular segment shells are adjusted so that the volume enclosed in a first one of the working spaces increases while the volume enclosed in a second one of the working spaces decreases. Each of said working spaces are connected to a first setting pressure medium source separately via a non-return valve which opens toward a respective one of the working spaces, and the working spaces can be directly connected to one another by means of a control valve. A third circular segment shell is provide and forms with a first one of the circular segment shells a third working space for an additional adjustment of the rotational angle relationship.

14 Claims, 4 Drawing Sheets

(offset view)

DEVICE FOR ADJUSTING THE ROTATIONAL ANGLE RELATIONSHIP BETWEEN A CAMSHAFT AND ITS DRIVE ELEMENT

BACKGROUND OF THE INVENTION

The present invention relates to a device for adjusting a rotational angle relationship between a camshaft and its drive element.

More particularly, it relates to a device of the above mentioned general type in which the drive element has two circular segment shells movable relative to one another in a setting direction and connected so that during adjustment in the setting direction the shells are adjusted in opposite directions and the volume enclosed in a working space between the shells increases when the volume in the other working space decreases.

A device for adjusting the rotational angle relationship of a camshaft is known from EP-A-0,163,046 in which two hydraulic servomotors located on a diameter of a part connected to the camshaft are provided, each servomotor having a servo-piston, each of which acts via a roller on a ramp which is located on a drive gearwheel radially enclosing the part connected to the camshaft. The ramps respectively associated with the servomotors are inclined in opposite directions in such a way that when the servo-piston of one servomotor is adjusted, the camshaft is adjusted by means of the ramp relative to the drive gearwheel in such a way that the opposite ramp pushes the servo-piston of the other servomotor back. The servomotors are triggered by valves or a spool valve in such a way that the outwardly moving piston of one servomotor is subjected to pressure and the working space of the other, opposite servomotor is relieved so that the piston of the servomotor can move away following the ramp. In such a device, a separate pressure source and magnetic valves for controlling the servomotors are necessary.

German Application P 39,30,157, which is not a prior publication, describes a device for adjusting the rotational angle relationship of a camshaft used, in particular, to actuate gas exchange valves of an internal combustion engine, which device has two servomotors acting oppositely to one another whose movable walls corresponding to one another are connected together. In order to reduce the requirements for the provision of the setting medium and the generation of pressure in this setting medium, the working spaces of the servomotors are both connected via one non-return valve each to a setting medium pressure source, on the one hand, and, on the other, can be selectively and directly connected or separated from one another by means of a control valve so that torque fluctuations in one of the working spaces and the resulting pressure can be specifically used at certain times for adjustment, the working spaces being subsequently shut off again.

The mode of operation of the camshaft adjustment device described in Patent Application P 39,30,157, which is not a prior publication, is therefore based on the fact that positive and negative torque fluctuations, relative to the average drive torque, appear alternately over the whole of the rotational speed range. The working spaces of the servomotors are acted on by a spring in such a way that the spring acts in the sense of increasing the working space of a servomotor. Because the preload on the spiral spring is selected to correspond precisely to the average drive torque, a positive pressure similarly appears alternately in the working spaces. By means of a control valve, these pressure peaks can be used directly and specifically as the pressure medium source for adjustment.

Operation, however, is problematic at low engine rotational speeds and at the starting rotational speed of the engine because the torque fluctuations become smaller, at an average drive torque, because of decreasing mass forces. If deviations now occur in the average torque due to temperature changes or variations between individual units, it may happen that the camshaft can only be adjusted in one direction.

SUMMARY OF THE INVENTION

Accordingly, it is an object of the present invention to provide a device for adjusting a rotational angle relationship between a camshaft and its drive element, which avoids the disadvantages of the prior art.

In keeping with these objects and with others which will become apparent hereinafter, one feature of the present invention resides, briefly stated, in a device for adjusting a rotational angular relationship between a camshaft and its drive element in which the volumes enclosed in the working spaces are increased and decreased during an adjustment by the same amounts, each of the working spaces can be connected by a non-return valve open in direction of the working space to the first setting pressure medium source and can be directly connected to one another by means of a control valve controlled by a control device, and a third circular segment shell forms with the first circular segment shell a third working space by means of which an additional adjustment of the rotational angle relationship can be provided.

When the device is designed in accordance with the present invention, it permits reliable adjustment of the camshaft at low rotational speeds of the engine and producing a reliable engine starting.

In a device such as is described in Patent Application P 39,30,157, which is not a prior publication, two circular segment shells movable relative to one another in the setting direction are each connected to a first setting pressure medium source by means of a valve in order to adjust the rotational angle relationship between a camshaft, used in particular for actuating gas exchange valves of an internal combustion engine, and its drive element. The circular segment shells are connected together in such a way that during adjustment in the setting direction, the circular segment shells are adjusted in opposite directions and the volume enclosed in the working space bounded by one first circular segment shell and one second circular segment shell increases when the volume in the other working space decreases. The volumes enclosed in the working spaces are increased and decreased by the same amounts during adjustment. The working spaces can be connected to the first setting pressure medium source via a non-return valve open in the direction of the working space and can be directly connected to one another by means of a control valve controlled by a control device.

This camshaft adjustment device is extended, according to the invention, by an additional working space. The third working space is formed by a third circular segment shell and the second circular segment shell and by means of it, an additional adjustment of the rotational angle relationship can be effected. This has the advantage that in addition to the adjustment possibilities provided by the arrangement described in P 39,30,157, a separate adjustment is possible for other rotational speed ranges. For this purpose, a second setting pressure medium source can, in particular, be used and this can be actuated independently of the first setting pressure medium source.

Preloading is effected by a spring, particularly one arranged on an end surface, which is preferably arranged in the peripheral direction. This preload is selected, according to the invention, in such a way that it is smaller in every case than the camshaft drive torque. This has the advantage that when starting with the magnetic valve open, the device is adjusted in the "retarded" direction because of the larger camshaft torque. If the device now has to be adjusted in the "advanced" direction in the lower rotational speed range, the additional working space is preferably subjected to pressure by means of an external setting pressure medium source.

For this purpose, a valve is connected which is preferably a 2/2 magnetic valve and is located in a bypass to the setting pressure medium source. Because the drive torque MA is greater than the spring torque MS in the normal case, it would only be possible to adjust the device in the "retarded" direction. Superimposing, in accordance with the invention, an additional torque MZ produced by the additional working space permits adjustment of the device in the "advanced" direction. At higher rotational speeds, at which sufficiently high amplitudes of the drive torque MA occur, it is advantageous to switch off the additional pump.

Any asymmetries which may be present in the amplitudes can be balanced out with respect to the adjustment by different control durations of the main valve of the working spaces. It is advantageous to select the pressure level of the additional pump as 10 bar This permits the use of a low-cost unit made up of electric motor and pump. The same applies to the bypass valve, because no special requirements have to be set with respect to the pressure level and the switching periods in the lower rotational speed range.

As an alternative, an embodiment can be used in which the additional torque MZ is adjusted by means of the pressure in the additional working space, using rotational speed control of the pump drive motor, in such a way that the adjustment rate in both directions is of equal magnitude. Recognition can take place by analysis of sensor angle signals at the crankshaft and the camshaft. In this solution proposal, a return flow throttle is arranged parallel to the setting pressure medium source. The bypass magnetic valve is closed during the control operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 5:
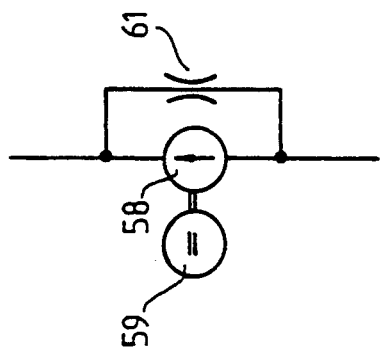
FIG. 5 is a view showing a return flow throttle of the inventive camshaft adjustment device.
Figure 1:
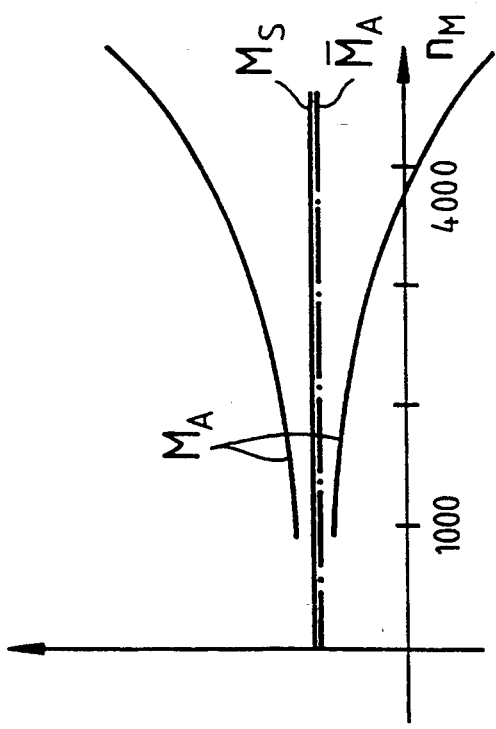
FIG. 1 is a view showing an ideal torque variation at a camshaft.

FIG. 1 shows the ideal torque variation at the camshaft. The camshaft torque is plotted on the ordinate and the rotational speed of the camshaft is plotted on the abscissa. The curves of the drive torque MA extend in the positive and negative directions symmetrically about the spiral spring torque MS. The spiral spring torque MS and the average drive torque $\overline{MA}$ extend parallel with similar magnitude.

Figure 2:
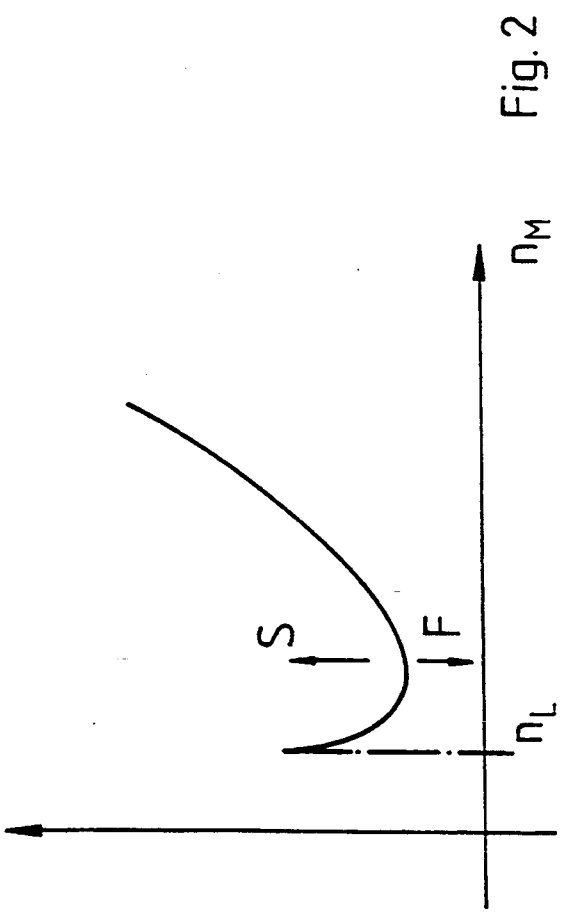
FIG. 2 shows a variation of a camshaft adjustment curve.

FIG. 2 shows the variation of a camshaft adjustment curve. The required value of the camshaft twist is plotted on the ordinate and the rotational speed of the engine is plotted on the abscissa. Starting with the idling rotational speed $n_L$, the camshaft twist is adjusted, from a value corresponding to a retarded end of admission to a value corresponding to an advanced end of admission, until a minimum value is reached. With increasing rotational speed, the value is displaced to a retarded end of admission. In accordance with the invention, the curve can be displaced in both the direction S ("retarded") and the direction F ("advanced").

Figure 3:
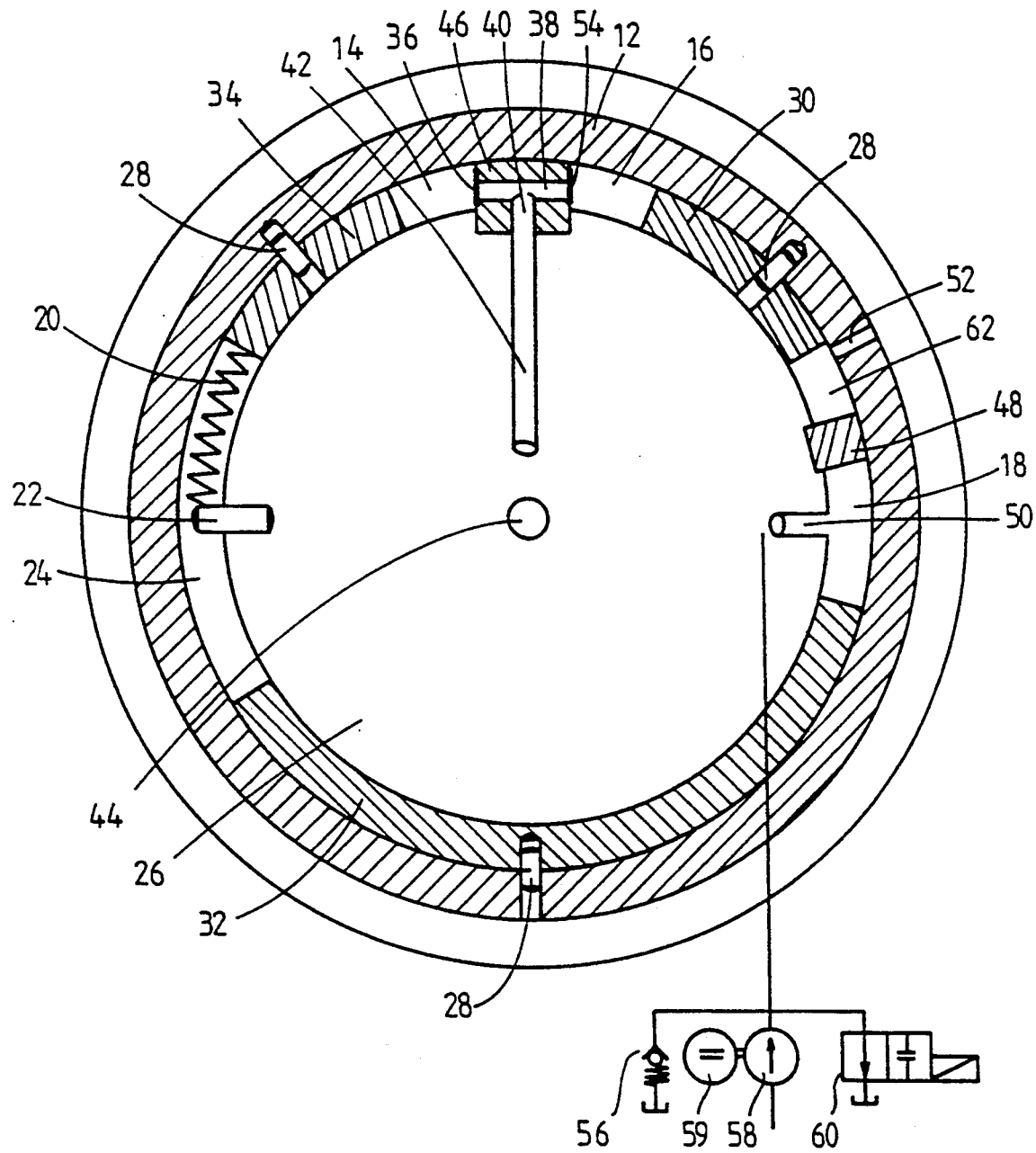
FIG. 3 shows a camshaft adjustment device in accordance with the present invention.
Figure 6:
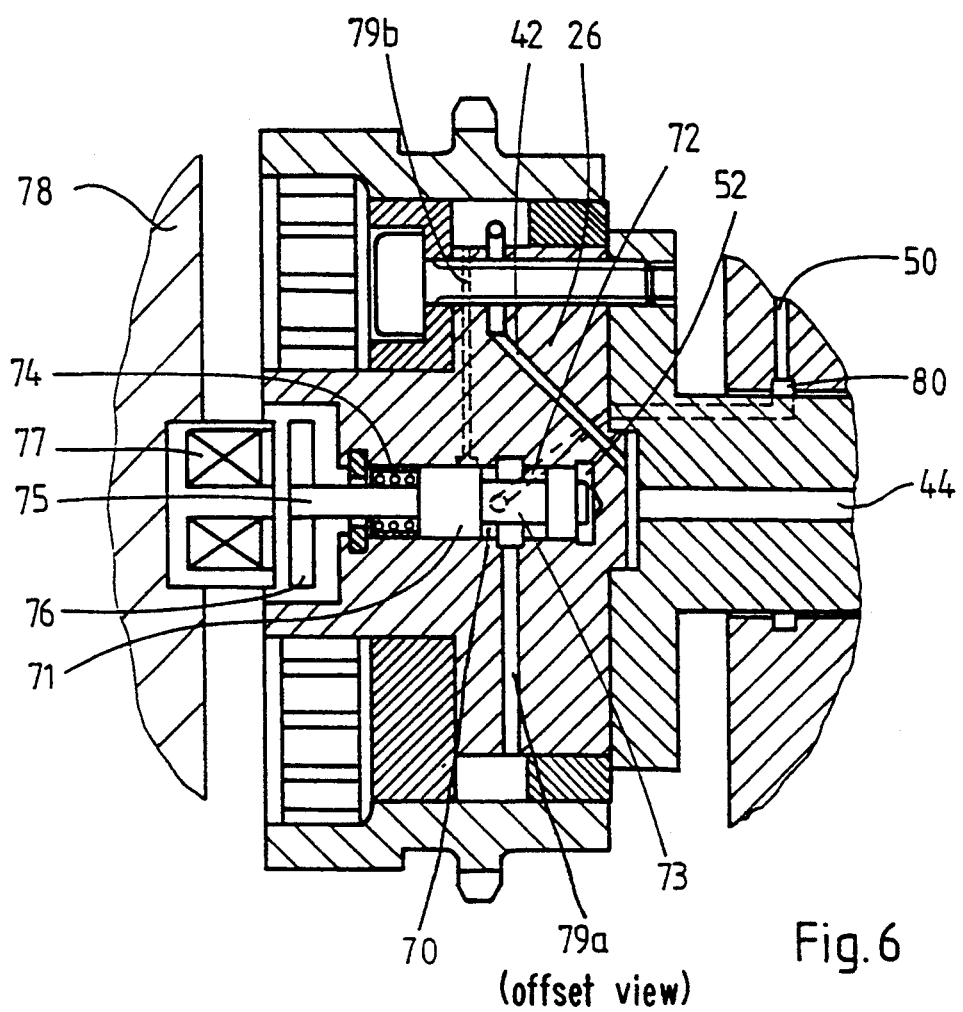
FIG. 6 is a view showing a longitudinal section through the camshaft adjustment device of the present invention.

FIG. 3 shows an embodiment example of the camshaft adjustment device according to the invention. The figure shows a section through a camshaft with an axial pressure medium conduit 44 which comes, for example, from the pressurized oil supply of an associated internal combustion engine. The pressure medium conduit is part of an accommodation part 26 which is fastened by means of bolts to the end surface of an end flange as shown in FIG. 6.

The accommodation part 26 is of cylindrical construction and carries, at its periphery, circular segment shells 30, 32, 34 which are fastened by means of pins 28 so that they rotate with a drive element 12. As may be seen from FIG. 3, the circular segment shell 30 and the circular segment shell 34 enclose a first working space 14 and a second working space 16 which are separated from one another by means of a feather key 46. The circular segment shell 32 and the circular segment shell 30 enclose a third working space 18. The third working space 18 is divided by means of a feather key 48. The part 62 of the working space 18 is connected by means of an unpressurised return 52 to a pressure medium container (not shown) so that, when the volume of the part 62 of the third working space 18 is changed, the pressure medium can be drained off or supplemented. The change to the volume of the third working space 18 is effected by controlling the pressure medium. The circular segment shell 32 and the circular segment shell 34 enclose, in turn, a recess 24 in which a spring 20 is supported. The spring 20 is held at a definite preload by a pin 22 acting as a stop for the spring.

The outer front surface of the feather key 46 is in contact with the inner surface of the drive element 12 and therefore separates, from one another, the working spaces 14, 16 directly adjacent to the lateral end surfaces of the feather key. Both working spaces 14, 16 can be connected to a transverse hole 38 in the feather key 46. The transverse hole 38 being connected via a radial hole 40 and a pressure medium conduit 42 extending further in the accommodation part 26 to the pressure medium conduit 44 (in a manner not shown). A spring non-return valve 36, 54 is provided in each of the working spaces 14, 16 at the outlets at each end of the transverse hole 38. A direct connection 79a and 79b exists between the first and second working spaces 14, 16 via a control valve 70 as shown in FIG. 6 and will be described later.

The pressure necessary for adjusting the camshaft in the "advanced" direction is supplied via a pressure medium conduit 50 to the third working space 18 by means of setting pressure medium source 58 with associated drive unit 59 and parallel-connected control valve 60. In order to avoid damage due to excess pressure, a pressure-limiting valve 56 is connected in parallel with the setting pressure medium source 58 in this embodiment example.

The preload is effected by the spring 20 arranged on the end surface and, in this embodiment example, arranged in the peripheral direction. This preload is selected, according to the invention, in such a way that it is smaller in every case than the camshaft drive torque. This has the advantage that during starting with the magnetic valve open, the device is adjusted in the "retarded" direction because of the larger camshaft torque. If the device is now to be adjusted in the "advanced" direction in the lower rotational speed range, the additional working space 18 is subjected to pressure by means of the external setting pressure medium source 58. For this purpose, a control valve 60, preferably a 2/2 magnetic valve arranged in a bypass to the setting pressure medium source 58, is closed. Because the drive torque MA is greater than the spring torque MS in the normal case, it would only be possible to adjust the device in the "retarded" direction. Adjustment of the device in the "advanced" direction is possible by superimposing, according to the invention, an additional torque MZ effected by the additional working space 18. At higher rotational speeds, at which sufficiently high amplitudes of the drive torque MA occur, it is advantageous to switch off the setting pressure medium source 58, preferably by opening the control valve 60.

Any asymmetries which may be present in the amplitudes can be balanced out with respect to the adjustment by different control durations of the main valve of the working spaces 14, 16. It is advantageous to select the pressure level of the setting pressure medium source 58 as 10 bar. This permits the use of a low-cost unit made up of electric motor and pump. The same applies to the control valve 60, because no special requirements have to be set with respect to the pressure level and the switching periods in the lower rotational speed range.

As an alternative, an embodiment can be used in which the additional torque MZ is adjusted by means of the pressure in the additional working space, using rotational speed control of the drive unit 59 of the setting pressure medium source 58, in such a way that the adjustment rate in both directions is of equal magnitude. Recognition can take place by analysis of sensor angle signals at the crankshaft and the camshaft. In this solution proposal, a return flow throttle 61 is arranged parallel to the setting pressure medium source 58. The control valve 60 is closed during the control operation.

It is advantageous to connect the external pressure unit 56, 58, 60 via an annular groove in the camshaft bearing.

Figure 4:
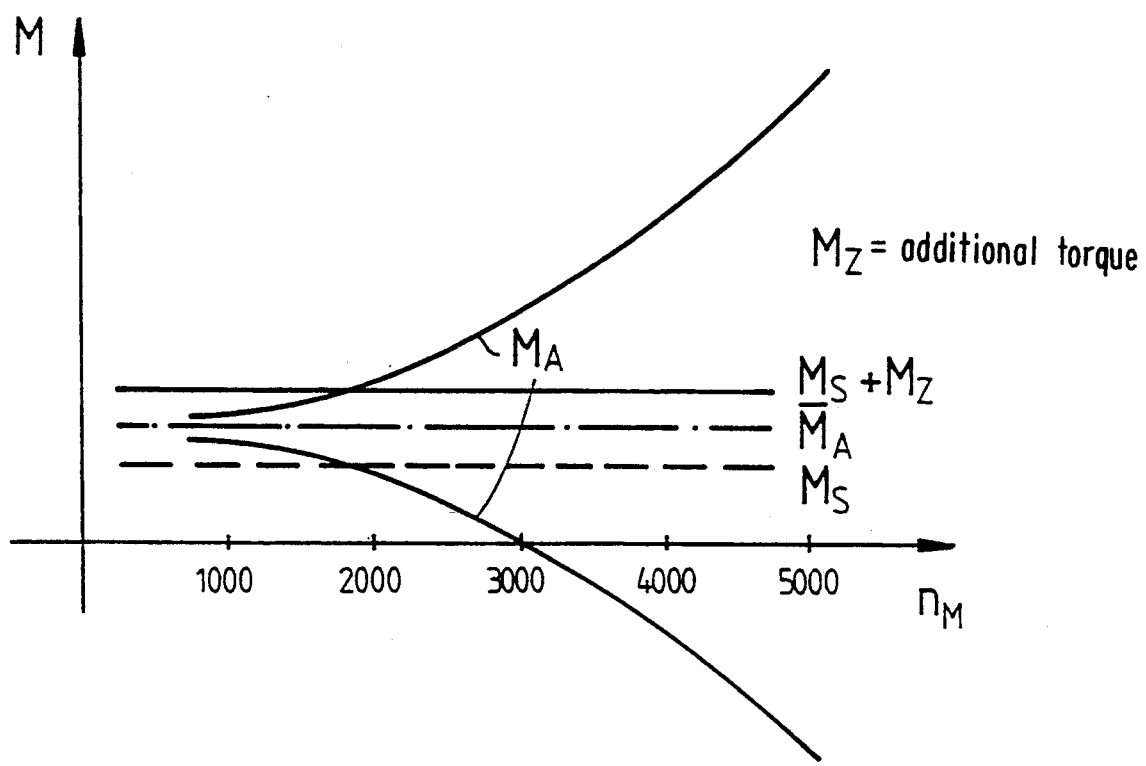
FIG. 4 is a view showing a torque distribution of the camshaft adjustment device in accordance with the present invention.

FIG. 4 shows a torque distribution of the camshaft adjustment device according to the invention, as shown in FIG. 3. The camshaft torque M is plotted on the ordinate and the rotational speed of the camshaft is plotted on the abscissa. The curves of the drive torque MA extend in the positive and negative directions symmetrically about the average camshaft torque $\overline{MA}$. The spiral spring torque MS is smaller than the average drive torque $\overline{MA}$. The adjustment of the camshaft in the "advanced" direction at low rotational speeds is therefore possible by superimposing the additional torque MZ, produced by the third working space 18, on the spiral spring torque MS.

FIG. 6 shows a longitudinal section through the camshaft adjustment device of FIG. 3. The control valve 60 is here embodied as a magnetic valve 70 in the form of a spool valve with a spool 71, which can be displaced within an axial hole 72 in the accommodation part 26. The spool 71 has an annular groove 73 which, in its end position, is connected to the inlet from the connecting conduit 79a. The connecting conduit 79a acts to supply the working space 14, and the part of the spool 71 pointing towards the end surface of the accommodation part 26 closes the inlet of the connecting conduit 79b, which acts to supply the working space 16, into the axial hole 72. In this position, the spool 71 is preloaded by a return spring 74. An actuation pin 75 protrudes outwards in the direction of the end surface of the accommodation part 26 and there carries an anchor plate 76, which is located opposite to an electromagnet 77 and can be adjusted by the latter against the force of the return spring in such a way that the spool 71 brings the inlet from the connecting conduit 79b into connection with the annular groove 73 which in turn remains in connection with the connecting conduit 79a. The electromagnet 77 is arranged so that it rotates with a cover part 78 through which electrical leads for the electromagnet 77 are led outwards. In addition, pressure medium can be supplied to the third working space 18 via the conduit 50 which enters an annular groove 80 in the camshaft bearing. As already shown in FIG. 3, the part 62 of the working space 18 is connected to an unpressurised return 52.

The invention is not limited in its embodiment to the preferred embodiment example given above. A number of variants are, rather, conceivable which make use of the solution presented even in the case of embodiments of a fundamentally different nature.

It will be understood that each of the elements described above, or two or more together, may also find a useful application in other types of constructions differing from the types described above.

While the invention has been illustrated and described as embodied in a device for adjusting the rotational angle relationship between a camshaft and its drive element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A device for adjusting a rotational angle relationship between a camshaft and its drive element, comprising two circular segment shells provided on the drive element together with an interposed part forming two working spaces therebetween, said both shells being connected to one of said camshaft and said drive element, and said interposed part being connected to the other of said cam shaft and said drive element while said circular segment shells being movable relative to said interposed part in a setting action such that during adjustment in a setting direction said circular segment shells are adjusted so that the volume enclosed in a first one of said working spaces increases while the volume enclosed in a second one of said working spaces decreases; means for connecting each of said working spaces to a first setting pressure medium source separately via a non-return valve which opens toward a respective one of said working spaces, and said working spaces can be directly connected to one another by means of a control valve; and a third circular segment shell and a first one of said circular segment shells form a third working space for an additional adjustment of the rotational angle relationship.

2. A device as defined in claim 1, wherein said third working space can be connected to a second setting pressure medium source which can be actuated independently of said first setting pressure medium source.

3. A device as defined in claim 1, wherein one of said two circular segment shells and said third circular segment shell form a recess; and further comprising a spring which is supported in said recess and biases one of said second and third circular segment shells counter to a support connected to said drive element and the camshaft respectively.

4. A device as defined in claim 3, wherein said spring is held at a defined preload.

5. A device as defined in claim 3, wherein said spring is held at a preload which is smaller than a camshaft drive torque.

6. A device as defined in claim 1, wherein said third working space is subjected to a second setting pressure medium source at a low rotational speed.

7. A device as defined in claim 1, wherein said third working space is subjected to a second setting pressure medium source during starting of an internal combustion engine.

8. A device as defined in claim 2, wherein said second setting pressure medium source is formed as a pump with a parallel-connected control valve.

9. A device as defined in claim 8, wherein said parallel-connected control valve is closed at low rotational speeds and is open at high rotational speeds.

10. A device as defined in claim 8, and further comprising a pressure limiting valve which is connected in parallel with said second setting pressure medium source.

11. A device as defined in claim 2, wherein said second setting pressure medium source is formed as a pump with a parallel-connected return flow throttle.

12. A device as defined in claim 11, wherein said pump has a controllable rotational speed.

13. A device as defined in claim 12, and further comprising means for analyzing a sensor angle signal at a crankshaft for controlling the rotational speed of said pump.

14. A device as defined in claim 1, and further comprising means for connecting said third working space with said second setting pressure medium source, said connecting means including an annular groove provided in a camshaft bearing.

* * * * *